United States Patent [19]

Rodewald

[11] 3,998,270
[45] Dec. 21, 1976

[54] OIL RECOVERY BY WATERFLOODING EMPLOYING GRAPHITE OXIDE FOR MOBILITY CONTROL

[75] Inventor: Paul G. Rodewald, Rocky Hill, N.J.

[73] Assignee: Mobil Oil Corporation, New York, N.Y.

[22] Filed: Aug. 1, 1975

[21] Appl. No.: 601,334

[52] U.S. Cl. .............................. 166/275; 166/273; 252/8.55 D
[51] Int. Cl.² ........................................ E21B 43/22
[58] Field of Search .......................... 166/273–275, 166/305 R, 292–294; 252/8.55 D

[56] References Cited
UNITED STATES PATENTS

| | | | |
|---|---|---|---|
| 1,651,311 | 11/1927 | Atkinson | 166/275 |
| 2,875,831 | 3/1959 | Martin et al. | 166/274 X |
| 3,294,164 | 12/1966 | Hardy et al. | 166/274 |
| 3,412,792 | 11/1968 | Parker et al. | 166/274 |
| 3,559,735 | 2/1971 | Corrin | 166/274 X |
| 3,691,071 | 9/1972 | Corrin | 166/274 X |
| 3,749,171 | 7/1973 | Marx | 166/274 |
| 3,817,330 | 6/1974 | Christopher et al. | 166/274 X |

*Primary Examiner*—Stephen J. Novosad
*Attorney, Agent, or Firm*—C. A. Huggett; William D. Jackson

[57] ABSTRACT

A method for the recovery of oil from an oil-containing subterranean formation by waterflooding employing as an injection medium an aqueous dispersion of a hydrophilic carbon oxide. According to a preferred form of the invention, particulate graphite oxide characterized by a surface layer in which the molar carbon to oxygen ratio is from about 2 to about 3 is utilized as a viscosifier to decrease the mobility ratio between the injected water and oil, thereby improving the efficiency of the waterflood. The graphite oxide may be characterized by a surface substantially free of —COOH groups, thereby being insensitive to divalent metal ions present in the subterranean formation. According to another form of the invention, the graphite oxide is reactive with the divalent metal ions within the subterranean formation to form a plugging deposit and thereby to function as a sealant for highly permeable strata within the formation.

18 Claims, No Drawings

OIL RECOVERY BY WATERFLOODING EMPLOYING GRAPHITE OXIDE FOR MOBILITY CONTROL

BACKGROUND OF THE INVENTION

This invention relates to the recovery of oil from subterranean reservoirs and, more particularly, to new and improved secondary recovery operations utilizing flood water including a dispersion of a hydrophilic carbon oxide for mobility control.

In the recovery of oil from oil-bearing reservoirs, it usually is possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In the supplemental techniques, which are commonly referred to as secondary recovery operations although in fact they may be primary or tertiary in sequence of employment, fluid is introduced into the reservoir in order to displace the oil therein to a suitable production system through which the oil may be withdrawn to the surface of the earth. The displacing medium may be a gas, an aqueous liquid, such as fresh water or brine, an oil-miscible liquid such as butane, or a water and oil-miscible liquid such as alcohol. Generally, the most promising of the secondary recovery techniques involves the injection into the reservoir of an aqueous flooding medium, either alone or in combination with other fluids.

One difficulty which often is encountered in secondary recovery operations is the relatively poor sweep efficiency of the injected displacing liquid. That is, the displacing liquid exhibits a tendency to channel through certain portions of the reservoir and to bypass other portions. Such poor sweep efficiency is occasioned by differences between the viscosity of the injected displacing medium and the in situ reservoir oil and also by permeability variations within the reservoir. The reservoir may comprise a plurality of fairly well-defined zones of widely diverse permeabilities. The injected displacing fluid preferentially flows through the more permeable zones of the reservoir thus leading to premature breakthrough of the displacing fluid at the production well or wells.

Even when the reservoir exhibits a relatively uniform permeability throughout, a situation referred to as instability fingering may develop in those instances where the viscosity of the injected displacing fluid is significantly less than the viscosity of the in situ reservoir oil. In this situation, the less viscous displacing fluid tends to develop fingers or bulges which may be caused by points of minute heterogeneities in the reservoir. These fingers of displacing fluid tend to become extended in the direction of flow and travel at a faster rate than the remainder of the injected fluid, thus again resulting in premature breakthrough at the production system.

Various techniques have been proposed in order to improve the sweep efficiency of the injected displacing fluid and thus avoid premature breakthrough. For example, it has been proposed in waterflooding operations to add thickening agents to at least a portion of the aqueous flooding medium in order to increase the viscosity thereof. The viscosity of the flooding medium may be increased prior to its injection into the reservoir or alternatively the viscosity may be increased in situ in order to avoid a reduction in injectivity at the injection well. For example, in U.S. Pat. No. 3,208,518 to Patton, there is disclosed a waterflooding process wherein the viscosity of the flooding medium is increased in situ through the use of high molecular weight polymers such as ionic polysaccharides produced by the fermentation of carbohydrates by bacteria of the genus Xanthomonas, under controlled pH conditions.

Various other techniques of improving sweep efficiency involve the selective formation of plugging agents within the more permeable zones of the reservoir. For example U.S. Pat. No. 3,522,844 to Abdo discloses a waterflooding process which employs a thickening agent which precipitates in the presence of divalent cations to form a plugging deposit in the reservoir. A chelating agent is injected in this process in order to control the formation of the plugging agent such that it is selectively precipitated at zones of crossflow between the strata of diverse permeabilities. In the Abdo process the thickening agent may be preceded by an aqueous solution of an alkali metal salt in order to effect an ion exchange reaction between the alkali metal ions and the divalent metal ions associated with the reservoir, thus placing the divalent metal ions in aqueous solution. Various other techniques for selectively plugging zones of an oil reservoir are known. For example, U.S. Pat. No. 3,396,790 to Eaton discloses a process wherein reactants are successively injected in a reservoir in order to produce an insoluble precipitate. U.S. Pat. No. 3,326,287 to Corrin and U.S. Pat. Nos. 3,476,187 and 3,618,664 to Harvey disclose the addition, to an aqueous driving fluid containing dissolved surfactants, of carbon black, kaolin and talc to function as carriers which transport the surfactants deeper into the stratum to more effectively displace oil.

SUMMARY OF THE INVENTION

In accordance with the present invention, there is provided a new and improved oil recovery process wherein a viscous aqueous dispersion of a hydrophilic carbon oxide is injected into a subterranean oil formation to decrease the mobility ratio between the injected water and oil, and to improve the efficiency of the waterflood. The invention is practiced in a subterranean oil reservoir which is penetrated by spaced injection and production systems defining a recovery zone of the reservoir. In carrying out the invention, an aqueous driving agent containing the hydrophilic carbon oxide is injected into the reservoir through the injection system. According to one form of the invention, the hydrophilic carbon oxide is utilized as a viscosifier or thickening agent under conditions such that it is insensitive to divalent metal ions present in the formation. According to another form of the invention, the hydrophilic carbon oxide is used in a form that is reactive with the divalent metal ions in the formation to form an insoluble gel with resultant partial plugging of the reservoir. This plugging occurs primarily in the more permeable zones with the result that the sweep efficiency of the process is enhanced.

Among the hydrophilic carbon oxides useful in the practice of the invention are the products of the oxidation of graphite, humic acid, carbon black, asphaltenes (coal or petroleum derived), coal (preferably anthracite), and petroleum coke. Generally speaking, the oxidation is performed by reacting the carbon in the form of fine particles, having average diameters ranging from 10 to 900 microns, with strong oxidizing mixtures containing one or more concentrated acids and oxidizing agents, as described in U.S. Pat. No. 2,798,878 to Hummers whose disclosure, by reference, is herein incorporated as part of the teaching and disclosure of the present invention.

In accordance with the invention, the hydrophilic carbon oxide is employed in the flooding water in an amount sufficient to increase its viscosity. In some cases, a total concentration of as small as 0.005 percent by weight will be satisfactory. Generally speaking, a total concentration ranging from about 0.01 to about 0.6 percent, and preferably from 0.05 to about 0.5 percent, is employed. In those instances where it is desired to plug a permeable stratum within a subterranean formation, it may be desirable to employ as high as 0.75 percent by weight, or more, of the hydrophilic carbon oxide. Where the carbon oxide is used as a viscosifier, a sufficient amount of the oxide is added to raise the viscosity of the aqueous dispersion to be injected into the oil-containing reservoir to a value which is from one to four times the viscosity of the reservoir oil.

The viscosity of an aqueous dispersion of a carbon oxide can be increased by reducing the particle size of the dispersed oxide. This can be achieved by shearing the carbon oxide dispersion, as in a Waring blender, for example, to cause a breakdown of the carbon oxide to smaller particles. In this connection, it has been found that the viscosity of a dispersion of a given concentration of carbon oxide depends on the highest shear used. Thus, for example, a dispersion including 0.1 percent by weight of graphite oxide which was characterized by a viscosity of 20 centipoises at 20 $sec^{-1}$ shear had its viscosity increased to 44 centipoises after being subjected to a shear of 200 $sec^{-1}$. The hydrophilic carbon oxide used in the practice of the invention will generally be characterized by an average particle size of from 0.1 to 10 microns and a surface layer in which the molar carbon to oxygen ratio is from about 2 to about 3. Preferably, the average particle size of the carbon oxide present in aqueous dispersions used in the practice of the invention is below about one micron. If desired, a base, such as sodium hydroxide or ammonia, for example, may be used in order to increase the viscosity of the carbon oxide dispersion with time. Other suitable bases will readily occur to those skilled in the art.

Acids and salts at low concentrations may also be added to the carbon oxide dispersion to increase its viscosity. Higher salt concentrations of the order of 1 to 10 percent by weight will effect a sol to gel transition. The chlorides and nitrates and sulfates of magnesium, calcium, barium, iron, aluminum, thorium, uranium, zirconium, and cerium will effect this transition.

The sensitivity of the carbon oxide to the presence of multivalent ions has been attributed to the presence of carboxy (i.e., —COOH groups) on the surface of the carbon oxide particles. In accordance with one form of the invention, this sensitivity of the carbon oxide to multivalent metal ions is reduced by removing the carboxy groups from the surfaces of such particles. This may be achieved by derivitizing the carboxy group by chemical reaction, e.g., by esterification by involving reaction of the carbon oxide with an alcohol to form ester groups, or by reduction, to convert the carboxy group to the corresponding alcohol. Other derivitizing techniques such, for example, as those involving the formation of the corresponding amides or imides from the carboxy groups will readily occur to those skilled in the art. The use of an oxidizing mixture comprising potassium dichromate, sulfuric acid and nitric acid in the oxidative treatment of the carbon particles will result in a hydrophilic carbon oxide with a lower carboxy content. Regardless of the derivitizing technique that is employed, the objective is to achieve removal of substantially all of the carboxy group so that the formation of the divalent metal salt of the carboxylic acid is substantially eliminated when the carbon oxide is exposed to the divalent metal ions present in the subterranean formation. In such applications, the carbon oxide is employed principally as a viscosifier or thickener to increase the viscosity of the water flood. Of course, the sensitivity of the carbon oxide to divalent metal ions is used to advantage in those applications in which the graphite oxide is to be employed as a sealant for highly permeable strata in oil-containing formations including divalent metal ions. The sensitivity of the carbon oxide to multivalent ions may also be diminished by adsorbing the carbon oxide onto the surface of finely divided ionic materials, such as aluminum hydroxide, for example, with a concomitant increase in the viscosity of the resulting dispersion. The final concentration of the aluminum hydroxide in the aqueous dispersion should be of the order of 0.1 percent by weight.

DESCRIPTION OF SPECIFIC EMBODIMENTS

In a preferred embodiment of the invention, the hydrophilic carbon oxide comprises graphite oxide characterized by a molar carbon to oxygen ratio of from about 2 to about 3. Graphite oxide is a brown to light yellow solid which can be prepared by reaction of graphite with strong oxidizing mixtures comprising concentrated sulfuric acid, an anhydrous nitrate and an anhydrous permanganate, for example, as described in U.S. Pat. No. 2,798,878 to Hummers, referred to above. In contrast to graphite, graphite oxide is hydrophilic and readily absorbs water. Highly viscous solutions have been prepared by shaking graphite oxide with water. H. Thiele, KOLL. Z., 15, 111 (1948). At a concentration of 0.006 weight percent, the oxide increases the viscosity of water by 10 percent, from 1.0 to 1.1 centipoises. A 0.05 weight percent dispersion of graphite oxide in water yields a viscosity of about 2 centipoises, and a concentration of 0.15 weight percent produces a viscosity of about 22 centipoises.

Graphite oxide was prepared from macrocrystalline graphite (although microcrystalline graphite may also be advantageously used) by the method disclosed in the aforesaid U.S. Pat. No. 2,798,878 to Hummers. The starting graphite material had an average particle size ranging from about 50 to 100 microns. The resulting graphite oxide, when dispersed in water formed a sol which was characteristically yellow in color, which signified that the carbon-to-oxygen molar ratio was about 2.1 to 2.4. The addition of 1 part of this carbon oxide to 999 parts of water resulted in a dispersion which had a viscosity of 26 centipoises. The addition of 5 percent of brine which was composed of sodium chloride, calcium chloride and magnesium chloride in a 6.4:2.6:1 weight ratio resulted in a sol to gel transition.

An aqueous dispersion (20 parts by weight of a 2 percent dispersion in water) of the foregoing graphite oxide was dispersed in 300 cc. of absolute methanol and centrifuged. The graphite oxide was washed in this manner a total of three times and then dispersed in 250 cc. anhydrous methanol. After the addition of 10.0 grams of sulfuric acid, the mixture was refluxed for 5 hours and washed as above five times with 150 cc. quantities of absolute methanol until the supernatant liquid was acid free. The resultant graphite oxide, when dispersed in water to a concentration of 0.1 percent, showed enhanced resistance to precipitation by brine when compared to the parent graphite oxide.

The present invention is carried out in a recovery zone of a subterranean oil-bearing reservoir. As will be understood by those skilled in the art, the term "recovery zone", as used herein and in the appended claims is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" may be utilized in which case the injection and production systems comprise rows of wells spaced from one another. In this type of pattern, the recovery zone, as defined by the spaced rows of injection and production wells, generally will be that portion of the reservoir underlying the area between the spaced rows. Exemplary of other patterns which may be used are the so-called "circular flood" patterns in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these wells which is subject to the displacing action of the injected flooding medium. The above and other patterns are well known to those skilled in the art, and for a more detailed description of such patterns reference is made to Uren, L. C., "Petroleum Production Engineering — Oil Field Exploitation," Second Edition, McGraw-Hill Book Company, Inc., New York and London, 1939, and, more particularly, to the section entitled "The Waterflooding Process", appearing at pages 444–459.

It also will be recognized that the invention may be carried out utilizing one or more dually completed injection production wells of the type, for example, disclosed in U.S. Pat. No. 2,725,106 to Ralph Spearow. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more dually completed wells of the type described in the aforementioned patent to Spearow and the production system would comprise the upper completion interval of one or more of such wells. In this case, of course, the recovery zone would be that portion of the reservoir subject to the displacing action of the flooding medium as it moves upwardly through the reservoir. For further description of other well arrangements which may be employed in waterflooding, reference is made to Calhoun, J.D., Jr., FUNDAMENTALS OF RESERVOIR ENGINEERING, University of Oklahoma Press, Norman, 1960, pp. 371–376.

The hydrophilic carbon oxide thickened flooding water may comprise the entire flooding liquid displacing the oil within the subterranean formation towards the production means. Ordinarily, however, a slug of the thickened flooding water of about 0.1 to about 0.5 pore volume, and preferably from about 0.1 to about 0.3 pore volume, will prove economically advantageous in recovering oil from the subterranean formation. The term "pore volume", as used herein to define the quantities of fluids injected in carrying out the invention, designates the pore volume of the formation underlying the well pattern defined by the wells comprising the injection and production systems.

The thickened flooding water recovers more oil if the interfacial tension between it and the in situ oil is lowered. Preferably, the thickened flooding water containing the hydrophilic carbon oxide dispersion also has a surfactant dissolved in it. The present invention may be used in connection with waterflooding processes in which an aqueous solution of petroleum sulfonates with designated equivalent weight ranges and under controlled conditions of salinity are injected, as described in a paper by W.R. Foster, entitled "A Low Tension Waterflooding Process," JOURNAL OF PETROLEUM TECHNOLOGY, 25, 205–210 (1973). Generally speaking, a concentration of surfactant is employed which will effect lowered interfacial tension between the flooding water thickened with a hydrophilic carbon oxide viscosifier in accordance with this invention and the oil it displaces within the subterranean formation. Ordinarily, a concentration of from about 0.01 to about 1.0 percent of the surfactant is required for the thickened flooding water to be effective. If desired, a slug of the surfactant containing water is first injected into the subterranean reservoir via the injection system followed by a thickened water slug which contains a hydrophilic carbon oxide of the present invention in a graded concentration to provide a maximum viscosity greater than the viscosity of the reservoir oil and a terminal viscosity near that of water. This thickened water slug may then be followed by a driving fluid such as a field brine, which is injected as necessary to carry the process of the invention.

Injection of an aqueous dispersion of a hydrophilic carbon oxide, as described above, does not require special equipment over that ordinarily employed in carrying out a waterflood.

As noted above, the hydrophilic carbon oxide may be used as a thickener or viscosifier to increase the viscosity of the flood water and may, if desired, be modified to lower its sensitivity to the presence of divalent metal ions present in the formation. In addition, advantage can be taken of the sensitivity of the unmodified hydrophilic carbon oxide to divalent metal ions, and the carbon oxide may be used as a channel block agent in highly permeable strata including divalent metal ions. In some reservoirs, there may not be sufficient divalent metal ions in solution to cause precipitation of the desired volume of plugging deposit. In such instances, the concentration of such ions may be increased by preceding the injection of the aqueous dispersion of hydrophilic carbon oxide with an injection into the reservoir of an aqueous solution of an alkali metal salt. Petroleum reservoirs typically contain clays such as illites or montmorillonites which comprise calcium or magnesium oxides. By initially injecting an aqueous solution of an alkali metal salt, typically sodium chloride, an ion exchange reaction may be effected between the alkali metal ions and the divalent metal ions associated with the reservoir clays. Thus, the divalent metal ions are placed in aqueous solution in order ultimately to form the desired plugging deposits within the reservoir. Should this approach be utilized, it usually will be desired to initially inject the alkali metal salt in a relatively high concentration, e.g., of the order of 4 percent by weight and then gradually to reduce the alkali metal salt to the concentration of the resident fluids of the reservoir undergoing treatment. The alkali metal salt may be injected in a separate slug preceding the injection of the carbon oxide dispersion. Thereafter, the aqueous dispersion of the hydrophilic carbon oxide may be injected into the reservoir as previously described.

As will be appreciated by those skilled in the art, the present invention provides a new and improved method for achieving mobility control in waterflooding operations used in oil recovery. Water thickened with various polymeric materials is an integral part of tertiary oil recovery. Current polysaccharides and polyacrylamide thickeners have disadvantages in that the former are thermally unstable, and the latter are sensitive to salts. The hydrophilic carbon oxides used in accordance with the present invention have higher thermal stability, can be modified to have a much lower sensitivity to salts, and are more economically attractive than the above polymeric thickeners.

It should be understood that while the present invention has been described in considerable detail with respect to certain specific embodiments thereof, it should not be considered limited to such embodiments but may be used in other ways with departure from the spirit of the invention or the scope of the appended claims.

What is claimed is:

1. In a method for recovery of oil from an oil-containing subterranean formation wherein a fluid is injected through an injection means and into said formation, the improvement comprising:
   injecting through said injection means and into said formation and aqueous dispersion of a graphite oxide.

2. The method of claim 1 in which the graphite oxide is characterized by a surface layer in which the molar carbon to oxygen ratio is from about 2 to about 3.

3. The method of claim 1 in which said graphite oxide concentration is from about 0.005 to about 0.75 percent of the total weight of said aqueous dispersion.

4. The method of claim 1 in which said graphite oxide is characterized by a surface layer which is substantially free of —COOH groups, thereby being insensitivie to divalent metal ions present in said formation.

5. The method of claim 1 in which said aqueous dispersion is alkaline.

6. The method of claim 1 in which the graphite oxide is in the form of fine particles having average diameters of less than 1 micron.

7. The method of claim 1 in which said graphite oxide is reactive with divalent metal ions in said formation to form a plugging deposit within said formation.

8. In the recovery of oil from a subterranean oil reservoir penetrated by spaced injection and production systems defining a recovery zone of said reservoir, the method comprising:
   introducing into said reservoir, via said injection system, an aqueous dispersion of a particulate, graphite oxide characterized by a surface layer in which the molar carbon to oxygen ratio is from about 2 to about 3 to displace reservoir oil to said production system, and
   recovering oil from said production system.

9. The method of claim 8 in which the surfaces of at least a portion of said particulate graphite oxide are substantially free of —COOH groups.

10. The method of claim 8 in which the surfaces of at least a portion of said particulate graphite oxide include —COOH groups reactive with divalent metal ions in said reservoir to form a plugging deposit within said reservoir.

11. The method of claim 8 in which said graphite oxide concentration is from about 0.005 to about 0.75 percent of the total weight of said aqueous dispersion.

12. The method of claim 8 in which the average particle size of said particulate graphite oxide is less than one micron.

13. The method of claim 8 in which said aqueous dispersion is alkaline.

14. In the recovery of oil from a subterranean reservoir penetrated by spaced injection and production systems defining a recovery zone of said reservoir, the method comprising:
   injecting into said reservoir via said injecting system an effective amount of an aqueous driving agent including a viscosifier comprising a particulate graphite oxide characterized by a surface layer in which the molar carbon to oxygen ratio is from about 2 to about 3, and
   recovering oil from said production system.

15. The method of claim 14 in which at least a portion of said graphite oxide in said dispersion is reactive with divalent metal ions within said reservoir to form a plugging deposit within said reservoir.

16. The method of claim 14 in which said graphite oxide concentration is from about 0.005 to about 0.75 percent of the total weight of said aqueous driving agent.

17. The method of claim 14 in which said graphite oxide is substantially free of —COOH groups reactive with divalent metal ions within said reservoir.

18. The method of claim 14 in which the average particle size of said particulate graphite oxide is less than 1 micron.

* * * * *

UNITED STATES PATENT OFFICE
CERTIFICATE OF CORRECTION

PATENT NO. : 3,998,270
DATED : December 21, 1976
INVENTOR(S) : Paul G. Rodewald

It is certified that error appears in the above-identified patent and that said Letters Patent are hereby corrected as shown below:

Column 5, line 64, "J. D." should read --J. C.--.
Column 7, line 31, "with departure" should read --without departure--;

line 40, "and aqueous" should read --an aqueous--;

line 50, "insensitivie" should read --insensitive--.

Signed and Sealed this

First Day of March 1977

[SEAL]

Attest:

RUTH C. MASON
*Attesting Officer*

C. MARSHALL DANN
*Commissioner of Patents and Trademarks*